United States Patent
Simonsson et al.

(10) Patent No.: US 9,554,379 B2
(45) Date of Patent: Jan. 24, 2017

(54) METHOD AND NETWORK NODE FOR LINK ADAPTATION IN A WIRELESS COMMUNICATIONS NETWORK

(71) Applicant: TELEFONAKTIEBOLAGET L M ERICSSON (PUBL), Stockholm (SE)

(72) Inventors: Arne Simonsson, Gammelstad (SE); Jonas Fröberg Olsson, Ljungsbro (SE); Olle Rosin, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/784,476

(22) PCT Filed: Apr. 24, 2013

(86) PCT No.: PCT/SE2013/050448
§ 371 (c)(1),
(2) Date: Oct. 14, 2015

(87) PCT Pub. No.: WO2014/175793
PCT Pub. Date: Oct. 30, 2014

(65) Prior Publication Data
US 2016/0100383 A1    Apr. 7, 2016

(51) Int. Cl.
*H04W 72/04* (2009.01)
*H04L 5/00* (2006.01)
(Continued)

(52) U.S. Cl.
CPC .......... *H04W 72/042* (2013.01); *H04L 1/0015* (2013.01); *H04L 1/0026* (2013.01);
(Continued)

(58) Field of Classification Search
CPC .. H04W 72/042; H04W 24/10; H04W 72/082; H04L 1/20; H04L 1/0026; H04L 1/0015; H04L 5/0046; H04L 5/0035; H04L 1/0009; H04L 1/0003; H04B 17/336; H04B 17/318; H04B 7/0417
See application file for complete search history.

(56) References Cited

U.S. PATENT DOCUMENTS 8,300,716 B1    10/2012    Lee et al.
2010/0296405 A1    11/2010    Madan et al.
(Continued)

FOREIGN PATENT DOCUMENTS

CN    102130749 A    7/2011
WO    2010/124725 A1    11/2010
(Continued)

OTHER PUBLICATIONS

Search Report issued by the European Patent Office in corresponding application No. 13 882 911.4, dated Mar. 29, 2016, 4 pages.
(Continued)

*Primary Examiner* — Chuong A Ngo
(74) *Attorney, Agent, or Firm* — Rothwell, Figg, Ernst & Manbeck, P.C.

(57) ABSTRACT

A method in network node for selecting a downlink modulation and coding scheme is provided. The network node obtains information comprising a first uplink signal strength of a transmission from the terminal in the first cell. The network node further obtains information comprising a second uplink signal strength of a transmission from the terminal in the second cell. The network node also obtains scheduled downlink transmission information for the respective first cell and second cell. The network node then selects a downlink modulation and coding scheme for transmission from one or more of the access point serving the first cell and the access point serving the second cell to the terminal. The selection is based on the obtained information comprising the first uplink signal strength, the obtained information comprising the second uplink signal strength,
(Continued)

and the obtained scheduled downlink transmission information for the respective first cell and second cell.

14 Claims, 5 Drawing Sheets

(51) Int. Cl.
    *H04L 1/20*     (2006.01)
    *H04W 24/10*     (2009.01)
    *H04W 72/08*     (2009.01)
    *H04L 1/00*     (2006.01)
    *H04B 7/04*     (2006.01)
    *H04B 17/318*     (2015.01)
    *H04B 17/336*     (2015.01)

(52) U.S. Cl.
    CPC .............. *H04L 1/20* (2013.01); *H04L 5/0035* (2013.01); *H04L 5/0046* (2013.01); *H04W 24/10* (2013.01); *H04W 72/082* (2013.01); *H04B 7/0417* (2013.01); *H04B 17/318* (2015.01); *H04B 17/336* (2015.01); *H04L 1/0003* (2013.01); *H04L 1/0009* (2013.01)

(56) References Cited

U.S. PATENT DOCUMENTS

2010/0317355 A1* 12/2010 Zangi ................... H04L 1/0001
                                                                455/450
2010/0322176 A1   12/2010   Chen et al.
2011/0098054 A1    4/2011   Gorokhov et al.
2012/0122507 A1    5/2012   Gao et al.
2012/0275411 A1   11/2012   Kim et al.

FOREIGN PATENT DOCUMENTS

WO     2011022733 A2     2/2011
WO     2011100466 A2     8/2011
WO     2011112017 A2     9/2011
WO     2013015607 A2     1/2013

OTHER PUBLICATIONS

Communication pursuant to Article 94(3) EPC issued by the European Patent Office in corresponding application No. 13 882 911.4 dated Apr. 20, 2016.
Novelty Search Report dated Mar. 30, 2013, 9 pages.
International Search Report and Written Opinion dated Feb. 27, 2014, in International Application No. PCT/SE2013/050448, 12 pages.
CATT "Applicability of channel reciprocity in LTE-A downlink transmission" 3GPP TSG RAN WG1 Meeting #59, R1-094553, 2009, 6 pages.
CATT "CQI Feedback for CoMP" 3GPP TSG RAN WG1 meeting #66bis, R1-112956, 2011, 6 pages.
CATT "Analysis of Feedback Signalling for Downlink CoMP" 3GPP TSG RAN WG1 meeting #57, R1-091986, 2009, 4 pages.

* cited by examiner

METHOD AND NETWORK NODE FOR LINK ADAPTATION IN A WIRELESS COMMUNICATIONS NETWORK

CROSS REFERENCE TO RELATED APPLICATION(S)

This application is a 35 U.S.C. §371 National Phase Entry Application from PCT/SE2013/050448, filed Apr. 24, 2013, designating the United States, the disclosure of which is incorporated herein in its entirety by reference.

TECHNICAL FIELD

Embodiments herein relate to a network node and a method therein. In particular, it relates to selecting downlink modulation and coding scheme in a wireless communication network.

BACKGROUND

Communication devices such as terminals are also known as e.g. User Equipments (UE), mobile terminals, wireless terminals and/or mobile stations. Terminals are enabled to communicate wirelessly in a cellular communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

Terminals may further be referred to as user equipments, mobile telephones, cellular telephones, laptops, tablet computers or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node. A cell is the geographical area where radio coverage is provided by the access node.

The access node may further control several transmission points, e.g. having Radio Units (RRUs). A cell can thus comprise one or more access nodes each controlling one or more transmission/reception points. A transmission point, also referred to as a transmission/reception point, is an entity that transmits and/or receives radio signals. The entity has a position in space, e.g. an antenna. An access node is an entity that controls one or more transmission points. The access node may e.g. be a base station such as a Radio Base Station (RBS), eNB, eNodeB, NodeB, B node, or BTS (Base Transceiver Station), depending on the technology and terminology used. The base stations may be of different classes such as e.g. macro eNodeB, home eNodeB or pico base station, based on transmission power and thereby also cell size.

Further, each access node may support one or several communication technologies. The access nodes communicate over the air interface operating on radio frequencies with the terminals within range of the access node. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

Every Transmission Time Interval (TTI), every ms in LTE, a transport format is selected when transmitting. The transport format defines a Modulation and Coding Scheme (MCS) and also transmission rank when transmitting single user Multiple Input Multiple Output (MIMO). The transmission rank defines the number of layers transmitted with parallel data streams. Link adaptation selects the transport format as a trade-off between that the transmission can be received and decoded by the terminal with a high probability given the radio conditions at the same time containing as many user data bits as possible. Downlink link adaptation is based on Channel State Information (CSI) reporting. CSI refers to known channel properties of a communication link.

This information describes how a signal propagates from a transmitter to a receiver and represents the combined effect of, for example, scattering, fading, and power decay with distance. The CSI makes it possible to adapt transmissions to current channel conditions, which is crucial for achieving reliable communication with high data rates in multi antenna systems.

A user equipment measures on downlink reference symbols and predict best rank, Modulation and Coding Scheme (MCS). The user equipment may further select a precoder. Proposed rank is reported as Rank Indicator (RI) and proposed MCS as Channel Quality Indicator (CQI). CQI is reported as quantized efficiency. E.g. for transmission mode 3, rank and CQI is reported, for transmission modes 4, 9, 10: rank, CSI and PMI is reported. CSI reporting is typically configured to be periodic. The choice of reporting period is a trade-off between outdated CSI information and uplink radio resources used for signaling.

The CQI may be noisy and is outdated when used in a base station such as an eNB for MCS selection. An outer-loop is used to adapt to the impact of this and compensate for channel changes and user equipment speed. The outer-loop is typically a Block Error Rate (BLER)-based jump algorithm that targets a certain Hybrid Automatic Repeat Request (HARQ) BLER, e.g. 10%, adjusting with a margin in dB for the CQI inaccuracy. The outer-loop also adapts to other measurement noise such as user equipment vendor implementation differences and measurement errors.

Co-ordinated link adaptation is a promising feature. With good backhaul the MCS selection may be improved with very small or no radio resource cost resulting in improved spectrum efficiency. Within the same base station the interference changes may be predicted every TTI. In a deployment with micro RRUs on the same base station as an overlaying macro RRU, fast and rather accurate MCS changes may be foreseen before measured and reported by the user equipment.

A RRU is a remote radio unit, sometimes also called a radio head, controlled by a base station over an electrical and/or optical interface. One interface that may be used between controlling base station and RRU is Common Public Radio Interface (CPRI). The RRUs may be with different power capability similar to base stations, micro RRU similar as a micro eNB around 2×5 W and macro equal similar as a marco eNB 2×20 W or more.

CSI Reference Signals (CSI-RS) are introduced in LTE release 10. CSI-RS may be used in shared cell ID deployment for CSI reporting.

Shared cell ID also referred to as combined cell is when two or more cells, which may be the same or different access nodes, are combined into one cell given the same cell ID and avoids performing handover between the access nodes. The separate access nodes, previous cells, are still scheduled as separate cells. To enable good link adaptation taking the radio condition and interference within the combined cell into account orthogonal CSI-RS are configured and transmitted from each access node.

CSI-RS improves the measurement accuracy and thereby also the link adaptation within the combined cell. CSI-Interference Measurement (IM) is introduced in LTE release 11 which improves the interference prediction by allocating empty symbols in the LTE time-frequency resource grid in a cell which improves interference measurement by the user equipment since there is then only interference energy present on these symbols.

The user equipment may be configured to send Sounding Reference Symbols (SRS). SRS may be used for uplink Radio Resource Management (RRM) features and uplink link adaptation.

In 3GPP Draft R1-094553, —20091109—*3rd Generation Partnership Project* (3*GPP*), Mobile Competence Centre; 650, route des Lucioles; F-06921 Sophia-Antipolis Cedex; France, Jeju; 20091109, a method relating to applicability of channel reciprocity in LTE-A downlink transmission" is shown.

R1-094553 discloses the support for single cell transmission in LTE-Advanced. Signal to Interference-plus-Noise Ratio (SINR) is calculated and used for determining a MCS based on uplink SRS for determining downlink channel quality.

This document relates to a single cell and a single transmission point, and focus on Multi User-Multiple input Multiple Output (MU-MIMO) and multipath channel estimation. In R1-094553, MCS may be selected based on Downlink channel correlation matrix R1 and R2, precoding matrix W1 and W2.

For Link Adaptation:

Outer-loop is a slow process which cannot capture fast interference variations.

CQI is delayed and outdated when used. It can only follow slowly varying interference variation and not bursty interference caused by short packet data bursts.

CQI is not very reliable. The CQI reporting is dependent on UE implementation. There can be large differences how an interference step impact on CQI and is related to true receiver performance.

Coordinated link adaptation although promising, is very challenging based on the available delayed and noisy UE measurement and reporting.

SUMMARY

It is therefore an object of embodiments herein to enhance the performance in a wireless communications network.

According to a first aspect of embodiments herein, the object is achieved by a method in a network node for selecting a downlink modulation and coding scheme in a wireless communication network. The wireless communication network comprises the network node, a first cell, a second cell and a terminal. The network node obtains information comprising a first uplink signal strength of a transmission from the terminal in the first cell. The first uplink signal strength of the transmission from the terminal is measured by an access node serving the first cell. The network node further obtains information comprising a second uplink signal strength of a transmission from the terminal in the second cell. The second uplink signal strength of the transmission from the terminal is measured by an access node serving the second cell. The network node also obtains scheduled downlink transmission information for the respective first cell and second cell. The network node then selects a downlink modulation and coding scheme for transmission from one or more of the access point serving the first cell and the access point serving the second cell to the terminal. The selection is based on the obtained information comprising the first uplink signal strength, the obtained information comprising the second uplink signal strength, and the obtained scheduled downlink transmission information for the respective first cell and second cell.

According to a second aspect of embodiments herein, the object is achieved by a network node for selecting a downlink modulation and coding scheme in a wireless communication network. The wireless communication network is adapted to comprise the network node, a first cell, a second cell and a terminal. The network node comprises an obtaining circuit configured to obtain information comprising a first uplink signal strength of a transmission from the terminal in a first cell, which first uplink signal strength of the transmission from the terminal is measured by an access node serving the first cell. The obtaining circuit is further configured to obtain information comprising a second uplink signal strength of a transmission from the terminal in a second cell, which second uplink signal strength of the transmission from the terminal is measured by an access node serving the second cell. The obtaining circuit is further configured to obtain scheduled downlink transmission information for the respective first cell and second cell. The network node further comprises a selecting circuit configured to select a downlink modulation and coding scheme for transmission from one or more of the access point serving the first cell and the access point serving the second cell to the terminal, based on the obtained information comprising the first uplink signal strength, the obtained information comprising the second uplink signal strength, and the obtained scheduled downlink transmission information for the respective first cell and second cell.

By taking into account, relevant information regarding the a first and second uplink signal strength of a transmission from the terminal in the respective first and second cell, and regarding scheduled downlink transmission information for the respective first cell and second cell, the selection of downlink modulation and coding scheme can be made with high accuracy. In this way the performance in a wireless communications network is enhanced.

An advantage with embodiments herein is that the link adaptation is improved since the assessment of the radio link quality is more accurate.

An advantage with embodiments herein is that the spectrum efficiency is improved since an improved link adaptation results in a more accurate modulation and coding scheme selection utilizing the radio spectrum better.

An advantage with embodiments herein is that a faster adaptation to bursty interference changes is provided.

An advantage with embodiments herein is that a shorter packet data delay is provided since fewer HARQ retransmissions are needed.

BRIEF DESCRIPTION OF THE DRAWINGS

Examples of embodiments herein are described in more detail with reference to attached drawings in which.

DETAILED DESCRIPTION

As part of developing embodiments herein, a problem will first be discussed.

Measurement capability in an eNB is in general much better than in a UE. Much more efforts may be spent on measurement accuracy in the eNB compared to the constraints in the UE on space, power consumption and cost. Hence uplink signal strength measurement such as uplink SRS measurement is expected to be far much more accurate than downlink RSRP and CQI measurements in the UE. Furthermore, the RSRP is filtered with both layer 1 and layer 3 filters. This makes the RSRP less appropriate to follow fast bursty interference variations.

The backhaul is expected to continuously be improved to support the increased data rates and requirements on short delay. This opens for more advanced fast co-ordination features such as shared cell. Also in the non-shared cell case the SRS measurements in other access points and eNB can be expected to become equally or even less delayed as UE reported downlink measurements.

Uplink SRS costs uplink radio resources, but that will also frequent uplink CQI or RSRP reporting do. Therefore a coordinated link adaptation based on uplink signal strength measurement such as uplink SRS measurement is an attractive method.

According to embodiments herein, downlink link adaptation is coordinated and mainly based on uplink signal strength measurements such as SRS measurements, received in several access points in combination with scheduling information. CQI is sparsely reported and only used to assist and predict interference from surrounding cells not included in the shared cell id or in the coordinated link adaptation.

Contrary to R1-094553 wherein selection of transport format is based on downlink channel correlation matrix R1 and R2, and precoding matrix W1 and W2, the selection of transport format such as modulation and coding scheme according to embodiments herein is based on uplink signal strength and scheduled downlink transmission information.

Figure 1A:
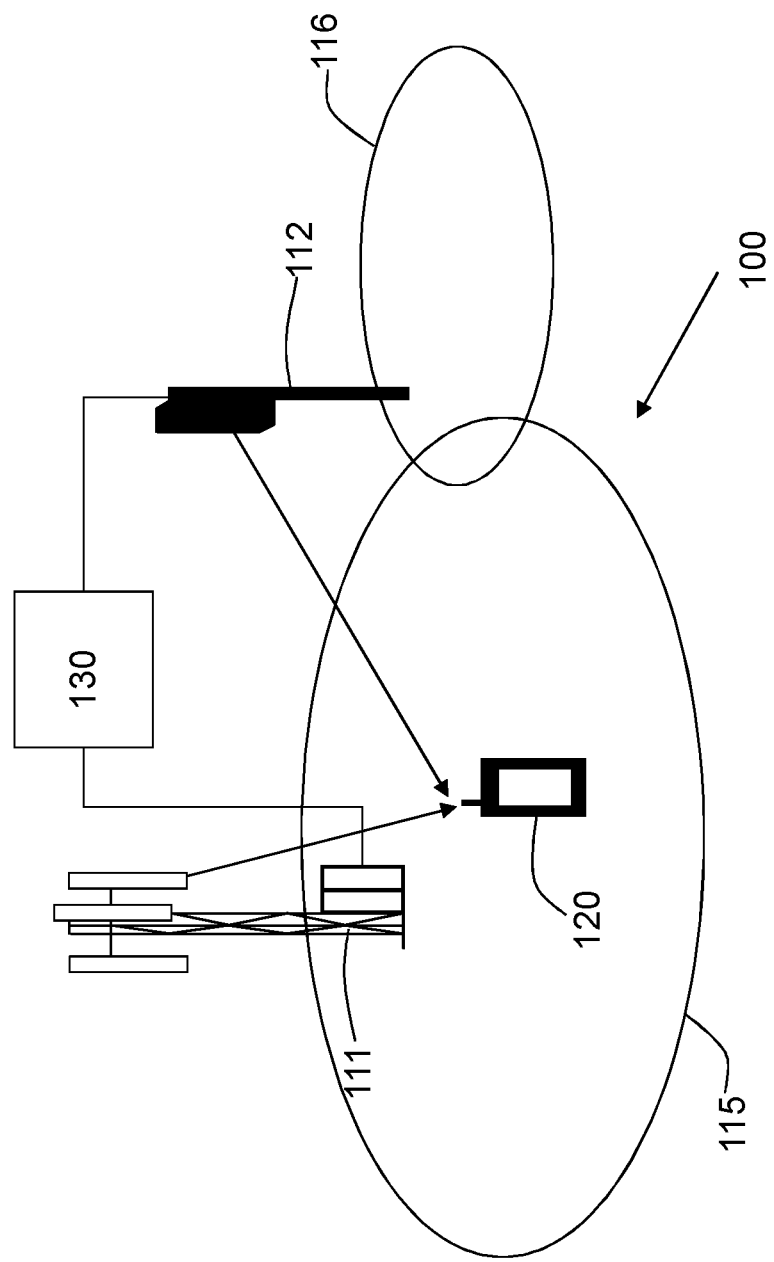
FIG. 1a is a schematic block diagram illustrating embodiments of a wireless communications network.

FIG. 1a depicts an example of a wireless communications network 100 according to a first scenario in which embodiments herein may be implemented. The wireless communications network 100 is a wireless communication network such as an LTE, WCDMA, GSM network, any 3GPP cellular network, Wimax, or any cellular network or system.

The wireless communications network 100 comprises a plurality of network nodes whereof two, a first access node 111 and a second access node 112 are depicted in FIG. 1a. The first access node 111 and the second access node 112 are network nodes which each may be an RRU or a radio head. However, in some embodiments the first access node 111 and the second access node 112 are network nodes which each may be an access node transmission point such as a radio base station, for example an eNB, an eNodeB, or an Home Node B, an Home eNode B or any other network node capable to serve a terminal such as a user equipment or a machine type communication device in a wireless communications network. The first access node 111 serves a first cell 115 and the second access node 112 serves a second cell 116. The first cell 115 and the second cell 116 may also be a so called combined cell.

When further access nodes are comprised in the wireless communications network 100, they may also serve a respective cell.

The wireless communications network 100 comprises one or more terminals whereof one, a terminal 120 is depicted in FIG. 1a. The first access node 111 and the second access node 112 may each be a transmission point for the terminal 120. The terminal 120 is within radio range of the first access node 111 and the second access node 112, this means that it can hear signals from the first access node and the second access node 112.

The terminal 120 may e.g. be a user equipment, a wireless device, a mobile terminal or a wireless terminal, a mobile phone, a computer such as e.g. a laptop, a Personal Digital Assistants (PDAs) or a tablet computer, sometimes referred to as a surf plate, with wireless capability, or any other radio network units capable to communicate over a radio link in a wireless communications network. Please note the term terminal used in this document also covers other wireless devices such as Machine to machine (M2M) devices.

The terminal 120 may be configured to transmit SRS.

The wireless communications network 100 further comprises a network node 130. In some embodiments, the network node 130 is a radio base station, for example an eNB, an eNodeB, or an Home Node B, an Home eNode B or any other network node capable to serve a terminal such as a user equipment or a machine type communication device in a wireless communications network. The network 130 may also be a Radio Network Control (RNC) node or a radio resource management node. This may be the case when the first access node 111 and the second access node 112 are RRUs.

According to this scenario in relation to FIG. 1a, a method for selecting a downlink modulation and coding scheme which will be described below is performed in the network node 130.

Figure 1B:
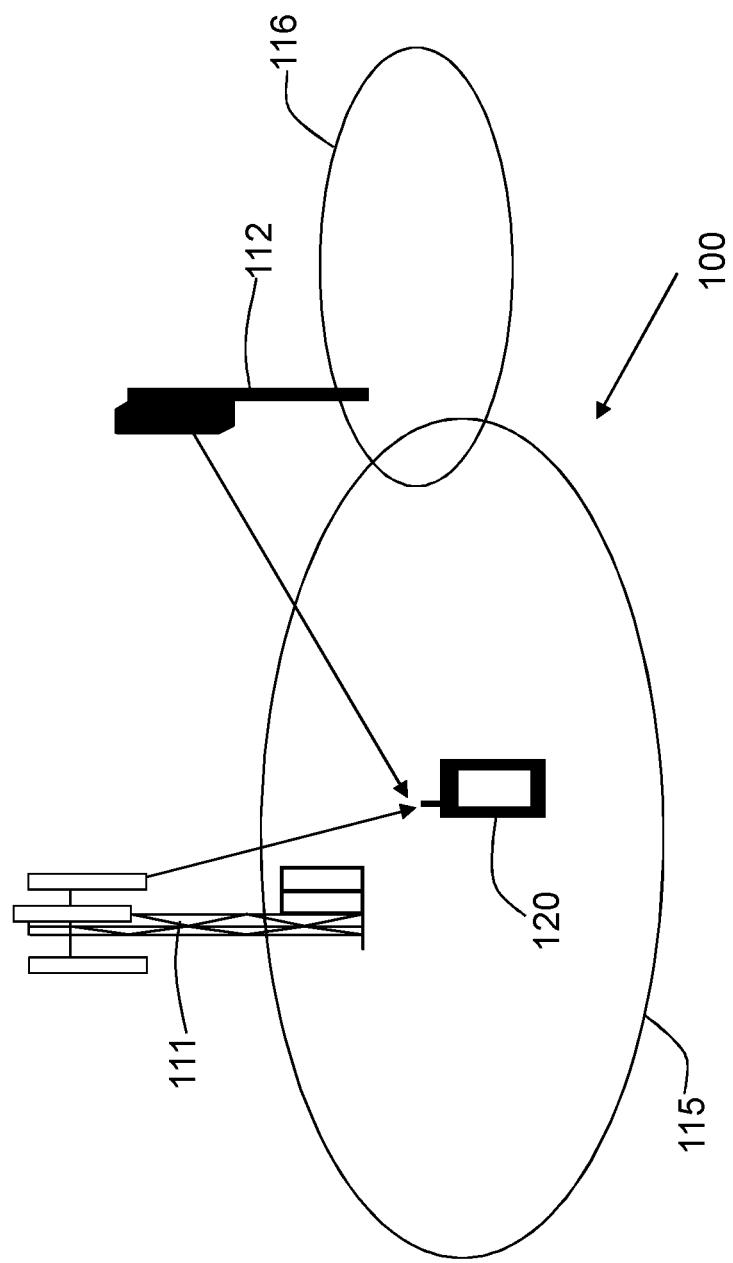
FIG. 1b is a schematic block diagram illustrating embodiments of a wireless communications network.

FIG. 1b depicts an example of a scenario of the wireless communications network 100 as depicted in FIG. 1a, but is different by not comprising the network node 130. According to the scenario relating to FIG. 1b, the method for selecting the downlink modulation and coding scheme is performed in the access node serving the first cell 115, i.e. the first access node 111, which first access node 111 also is referred to as a network node 111.

Figure 1C:
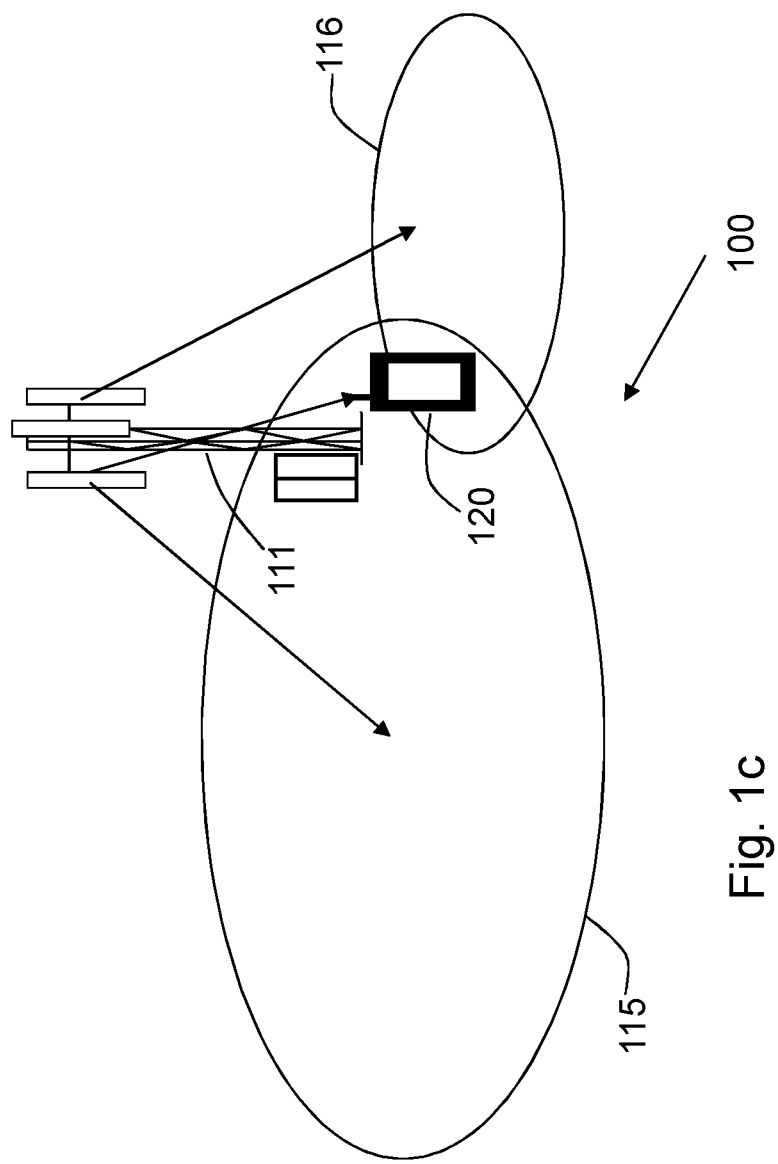
FIG. 1c is a schematic block diagram illustrating embodiments of a wireless communications network.

FIG. 1c depicts an example of a scenario of the wireless communications network 100 as depicted in FIG. 1a, but is different by the first access node 111 serving both the first cell 115 and the second cell 116. In this scenario the network node 130 may be comprised (not shown) or not comprised. According to the scenario relating to FIG. 1c, the method for selecting the downlink modulation and coding scheme may be performed in the access node serving the first cell 115, i.e. the first access node 111, which first access node 111 also is referred to as a network node 111, or in the network node 130.

Figure 2:
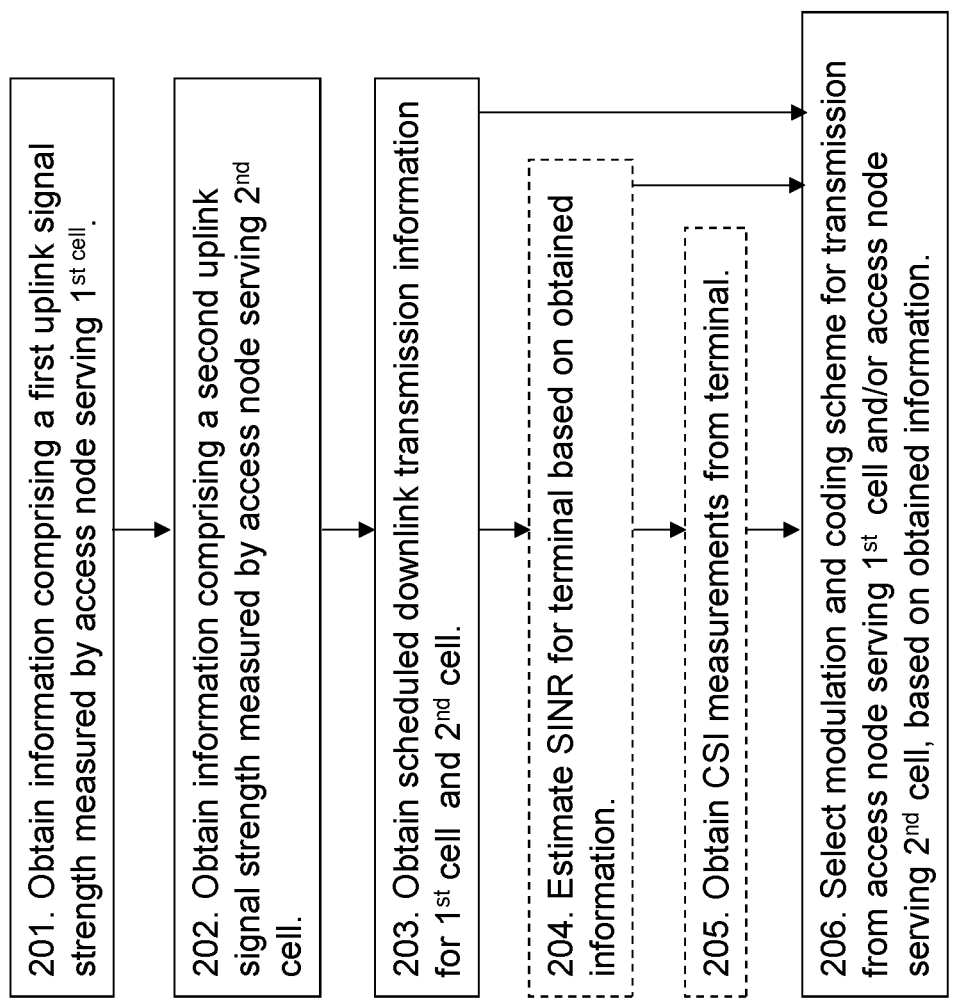
FIG. 2 is a flowchart depicting embodiments of a method in a network node

The network node in the text below may be any of the network node 130 and the first access node 111, and is therefore referred to as the network node 130, 111. Example of embodiments of a method in the network node 130, 111 for selecting a downlink modulation and coding scheme in a wireless communication network 100 will now be described with reference to a flowchart depicted in FIG. 2. As mentioned above, the wireless communication network 100 comprises the network node 130, 111, the first cell 115, the second cell 116 and the terminal 120. The method comprises the following actions, which actions may be taken in any suitable order. Dashed lines of one box in FIG. 2 indicate that this action is not mandatory.

Action 201

In a simplified example all UE:s such as the terminal 120 sends uplink SRS, and all downlink transmission points such as the first access node 111 and the second access node 112 measures SRS from all UE:s such as the terminal 120. This would enable building, on the network side, a full transmission (TX)-to-reception (RX) path loss-matrix with path loss estimates from all transmission points to all terminals. With such a matrix at hand a rather accurate interference impact from each transmission change may be estimated. The interference change on any UE, e.g. the terminal 120 from turning on a certain downlink transmission, may be predicted and thereby also a change in modulation and coding scheme, such as MCS, selection for that terminal 120. A shared cell scenario may get close to this simplified situation and SRS only based link adaptation may be feasible.

Therefore, in this action, the network node 111, 130 obtains information comprising a first uplink signal strength of a transmission from the terminal 120 in the first cell 115. The first uplink signal strength of the transmission from the terminal 120 is measured by an access node serving the first cell 115. This may e.g. be the first access node 111.

In some embodiments the network node 111, 130 is represented by the access node serving the first cell 115. In these embodiments, the information about the first uplink signal strength of the transmission from the terminal 120 is obtained by being measured by the access node serving the first cell 115.

The first uplink signal strength may be measured on sounding reference signals such as SRS from the terminal 120.

Action 202

The network node 111, 130 further obtains information comprising a second uplink signal strength of a transmission from the terminal 120 in the second cell 116. The second uplink signal strength of the transmission from the terminal 120 is measured by an access node serving the second cell 116. This may e.g. be the second access node 112. The information may be obtained by being received from the second access node 112. The message may be sent over the X2 interface. X2 interface is an interface between two base stations such as between the first access node 111 and the second access node 112. The signal strength may also be received as soft values of the SRS sent from an RRU over CPRI to an eNB such as the first access node 111.

The second uplink signal strength may also be measured on sounding reference signals such as SRS from the terminal 120.

In an example of many UEs, including the terminal 120, all SRS measurements are collected for each UE.

In case of more access nodes, the network node 111, 130 obtains further information comprising one or more uplink signal strength of a transmission from the terminal 120 in one or more further cells, measured by access nodes serving the respective further cells.

Action 203

The SRS estimating the path loss only indicate potential interference in case any transmission takes place. To estimate the actual interference the transmission decision must be known, that is the scheduling in the potential interfering access node. E.g., every TTI scheduling of downlink transmission in the shared cell is done.

Therefore the network node 111, 130 obtains scheduled downlink transmission information for the respective first cell 115 and second cell 116.

This may be sent over the X2 interface in case of the scenario of FIG. 1b, or it may be obtained within the same node in the scenarios of FIGS. 1a and 1c.

In some embodiments, the scheduled downlink transmission information comprises any one or more out of: a frequency allocation, a power, a rank, and a precoder, for the respective first cell 115 and second cell 116.

Action 204

This is an optional action. The SINR defines the radio condition and ability for the terminal 120 to receive and decode a transmission. The network node 111, 130 may estimate SINR for the terminal 120, based on the obtained information comprising the first uplink signal strength, the obtained information comprising the second uplink signal strength, and the obtained scheduled downlink transmission information for the respective access node serving the first cell 115 and access node serving second cell 116.

The SINR per UE including the terminal 120 may be predicted based on SRS measurement and scheduling decisions for all access points such as the access node serving the first cell 115 and access node serving second cell 116.

Action 205

This is an optional action. Terminal vendors implement receivers differently and will have different receiver performance. Also multipath environment and mobile speed have impact on receiver performance. This is reflected in CSI reports from the terminal 120.

Therefore the network node 111, 130 may further obtain from the terminal 120, one or more downlink CSI measurements. The CSI measurements may relate to CQI, rank and Precoder Matrix Index (PMI), which may be reported for a set of different hypothesis of transmissions.

Action 206

The network node 111, 130 then selects a downlink modulation and coding scheme for transmission from one or more of the access point serving the first cell 115 and the access point serving the second cell 116 to the terminal 120. The selection is based on the obtained information comprising the first uplink signal strength, the obtained information comprising the second uplink signal strength, and the obtained scheduled downlink transmission information for the respective first cell 115 and second cell 116.

In some embodiments, this action of selecting further comprises selecting any one or more out of: a rank, a power, a precoding matrix indicator (PMI) and a frequency allocation.

This action of selecting the modulation and coding scheme and if applicable any of the rank, the power, the precoding matrix indicator and the frequency allocation may further be based on the estimated SINR for the terminal 120 and/or the respective obtained one or more downlink CSI measurements.

The text below relates to any suitable embodiment above.

SINR Estimation

SIR does not include noise. This is insignificant if interference is dominating. The SINR estimation may in its simplest form, assuming all transmit points, e.g. first and second access nodes 111, 112, use the same downlink transmit power and are scheduled, be calculated as:

$$S\hat{I}R = \frac{rx_{SRS}^{connected}}{\sum rx_{SRS}^{others}}$$

where $rx_{SRS}$ is the received SRS signal strength in linear measures (mW) for the connected node, i.e. the first access node 111 and the other node, i.e. the second access node 112, scheduled TX points respectively. If different downlink transmit power $p_{DL}$ is used in different access points such as the first access node 111 and second access node 112 this has to be taken into account as:

$$S\hat{I}R = \frac{p_{DL}^{i=connected} \cdot rx_{SRS}^{i=connected}}{\sum_{i \neq connected} sch_{DL}^i \cdot p_{DL}^i \cdot rx_{SRS}^i}$$

where $p_{DL}$ is the downlink transmission power in linear measures (mW) and $sch_{DL}$ is the fraction of scheduled resource blocks [0 . . . 1].

SRS is power controlled but as envisioned in above described estimation the absolute transmit power of SRS may be omitted since it is the relative received power that is important in an interference limited situation. When receiver noise N has impact the used SRS transmit power shall preferably be taken into account.

$$S\hat{I}NR = \frac{p_{DL}^{i=connected} \cdot rx_{SRS}^{i=connected} / tx_{SRS}^{i=connected}}{N + \sum_{i \neq connected} sch_{DL}^i \cdot p_{DL}^i \cdot rx_{SRS}^i / tx_{SRS}^i}$$

where $tx_{SRS}$ is the SRS transmit power in linear measures (mW). The SRS transmit power may be obtained from a power headroom report from the terminal 120.

In a hybrid solution this link adaptation is only applied to a limited set of UE:s, for example UE:s such as the terminal 120, in the center of a shared cell where main interference sources are from within the shared cell. For the other UE:s traditional link adaptation based on CQI is used.

In other scenarios a limited set of transmission points may measure on each UE including the terminal 120. The most important interference sources may be selected, or the eNB such as the network node 130 or first access node 111, with good backhaul and short delay may be the reported set.

Extensions:

The SRS based SINR estimations may be used for any one out of: downlink coordinated scheduling also referred to as muting or blanking. SINR estimates may be calculated for all promising scheduling alternatives $sch_{DL}$. A combined scheduling optimizing system throughput or fairness may be selected.

The SRS based SINR estimations may be used for downlink coordinated power control similarly as downlink coordinated scheduling, finding a system optimal transmit power level $tx_{SRS}$ balancing terminal gain vs. caused interference.

Selection of when to use joint-transmission may be based on uplink SRS. The gain from joint transmission may be estimated and balanced to the cost of using two transmission points.

Figure 3:
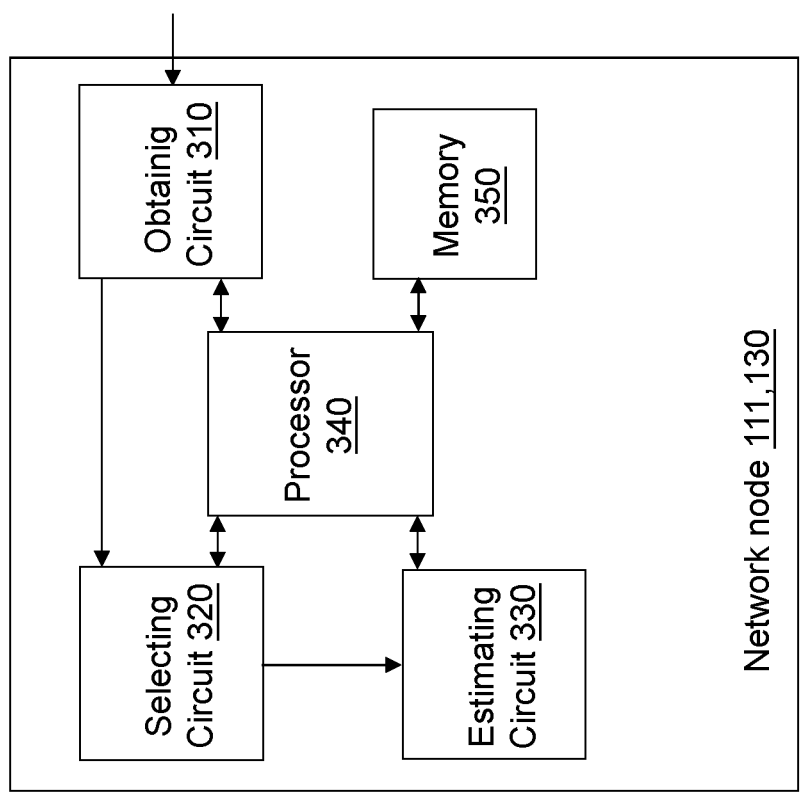
FIG. 3 is a schematic block diagram illustrating embodiments of a network node.

To perform the method actions for selecting a downlink modulation and coding scheme in a wireless communication network 100 described above in relation to FIG. 2, the network node 130, 111 comprises the following arrangement depicted in FIG. 3. As mentioned above the wireless communication network 100 is adapted to comprise the network node 130, 111, a first cell 115, a second cell 116 and a terminal 120.

The network node 130, 111 comprises an obtaining circuit 310 configured to obtain information comprising a first uplink signal strength of a transmission from the terminal 120 in a first cell 115. The first uplink signal strength of the transmission from the terminal 120 is measured by an access node serving the first cell 115.

In some embodiments, the network node 111, 130 is represented by the access node serving the first cell 115. In these embodiments the information about the first uplink signal strength of the transmission from the terminal 120 is to be obtained by being measured by the access node serving the first cell 115.

The obtaining circuit 310 is further configured to obtain information comprising a second uplink signal strength of a transmission from the terminal 120 in a second cell 116. the second uplink signal strength of the transmission from the terminal 120 is measured by an access node serving the second cell 116.

The respective first uplink signal strength and second uplink signal strength maybe measured on sounding reference signals from the terminal 120.

The obtaining circuit 310 is further configured to obtain scheduled downlink transmission information for the respective first cell 115 and second cell 116.

In some embodiments, the scheduled downlink transmission information comprises any one or more out of: a frequency allocation, a power, a rank, and a precoder such as a precoding matrix indicator, for the respective first cell 115 and second cell 116.

The network node 130, 111 further comprises a selecting circuit 320 configured to select a downlink modulation and coding scheme for transmission from one or more of the access point serving the first cell 115 and the access point serving the second cell 116 to the terminal 120. The selection is based on the obtained information comprising the first uplink signal strength, the obtained information comprising the second uplink signal strength, and the obtained scheduled downlink transmission information for the respective first cell 115 and second cell 116.

The selecting circuit 320 may further be configured to select any one or more out of: a rank, a power, a precoding matrix indicator and a frequency allocation.

The network node 130, 111 may further comprise an estimating circuit 330 configured to estimate a SINR for the terminal 120, based on the obtained information comprising the first uplink signal strength, the obtained information comprising the second uplink signal strength, and the obtained scheduled downlink transmission information for the respective access node serving the first cell 115 and access node serving second cell 116. In these embodiments, the selecting circuit 320 may further be configured to perform the selections, i.e. the modulation and coding scheme and if applicable any of the rank, the power, the precoding matrix indicator and the frequency allocation based on the estimated SINR for the terminal 120.

In some embodiments, the obtaining circuit 310 further is configured to obtain from the terminal 120, one or more downlink CSI measurements. In these embodiments the selecting circuit 320 may further be configured to perform the selections, i.e. the modulation and coding scheme and if applicable any of the rank, the power, the precoding matrix indicator and the frequency allocation further based on the respective obtained one or more downlink CSI measurements.

The embodiments herein for selecting a downlink modulation and coding scheme in the wireless communication network 100 may be implemented through one or more processors, such as a processor 340 in the network node 130, 111 depicted in FIG. 3, together with computer program code for performing the functions and actions of the embodiments herein. The program code mentioned above may also be provided as a computer program product, for instance in the form of a data carrier carrying computer program code for performing the embodiments herein when being loaded into the in the network node 130, 111. One such carrier may be in the form of a CD ROM disc. It is however feasible with other data carriers such as a memory stick. The computer program code may furthermore be provided as pure program code on a server and downloaded to the network node 130, 111.

The network node 111 may further comprise a memory 350 comprising one or more memory units. The memory 350 is arranged to be used to store obtained information, estimated SINR, CSI measurements, data, configurations, schedulings, and applications to perform the methods herein when being executed in the network node 130, 111.

Those skilled in the art will also appreciate that the obtaining circuit 310, selecting circuit 320 and estimating circuit 330 described above may refer to a combination of analog and digital circuits, and/or one or more processors configured with software and/or firmware, e.g. stored in the memory 350, that when executed by the one or more processors such as the processor 340 perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a network node for selecting a downlink modulation and coding scheme in a wireless communication network, which wireless communication network comprises the network node, a first cell, a second cell and a terminal, the method comprising:
   obtaining information comprising a first uplink signal strength of a transmission from the terminal in the first cell, which first uplink signal strength of the transmission from the terminal is measured by an access node serving the first cell;
   obtaining information comprising a second uplink signal strength of a transmission from the terminal in the second cell, which second uplink signal strength of the transmission from the terminal is measured by an access node serving the second cell;
   obtaining scheduled downlink transmission information for the respective first cell and second cell; and
   selecting a downlink modulation and coding scheme for transmission from one or more of the access point serving the first cell and the access point serving the second cell to the terminal, based on the obtained information comprising the first uplink signal strength, the obtained information comprising the second uplink signal strength, and the obtained scheduled downlink transmission information for the respective first cell and second cell.

2. The method according to claim 1, wherein the selecting further comprises selecting one or more of: a rank, a power, a precoding matrix indicator and a frequency allocation.

3. The method according to claim 1, wherein the network node is represented by the access node serving the first cell, and wherein information about the first uplink signal strength of the transmission from the terminal is obtained by being measured by the access node serving the first cell.

4. The method according to claim 1, wherein the scheduled downlink transmission information comprises one or more of: a frequency allocation, a power, a rank, and a precoder, for the respective first cell and second cell.

5. The method according to claim 1, wherein the respective first uplink signal strength and second uplink signal strength are measured on sounding reference signals from the terminal.

6. The method according to claim 1, further comprising:
   estimating Signal to Interference-plus-Noise Ratio, SINR, for the terminal, based on the obtained information comprising the first uplink signal strength, the obtained information comprising the respective second uplink signal strength, and the obtained scheduled downlink transmission information for the respective access node serving the first cell and access node serving second cell, and
   wherein selecting the modulation and coding scheme and, if applicable, any one of the rank, the power, the precoding matrix indicator and the frequency allocation, further is based on the estimated SINR for the terminal.

7. The method according to claim 1, further comprising:
   obtaining from the terminal, one or more downlink Channel State Information, CSI, measurements, and
   wherein the selecting the modulation and coding scheme and, if applicable, any one of the rank, the power, the precoding matrix indicator and the frequency allocation, further is based on the respective obtained one or more downlink CSI measurements.

8. A network node for selecting a downlink modulation and coding scheme in a wireless communication network, which wireless communication network is adapted to comprise the network node, a first cell, a second cell and a terminal,
   the network node comprising an obtaining circuit configured to obtain information comprising a first uplink signal strength of a transmission from the terminal in a first cell, which first uplink signal strength of the transmission from the terminal is measured by an access node serving the first cell,
   which obtaining circuit further is configured to obtain information comprising a second uplink signal strength of a transmission from the terminal in a second cell, which second uplink signal strength of the transmission from the terminal is measured by an access node serving the second cell,
   which obtaining circuit further is configured to obtain scheduled downlink transmission information for the respective first cell and second cell, and
   the network node further comprising a selecting circuit configured to select a downlink modulation and coding scheme for transmission from one or more of the access point serving the first cell and the access point serving the second cell to the terminal, based on the obtained information comprising the first uplink signal strength, the obtained information comprising the second uplink signal strength, and the obtained scheduled downlink transmission information for the respective first cell and second cell.

9. The network node according to claim 8, wherein the selecting circuit further is configured to select one or more of: a rank, a power, a precoding matrix indicator and a frequency allocation.

10. The network node according to claim 8, wherein the network node is represented by the access node serving the first cell, and wherein the information about the first uplink signal strength of the transmission from the terminal is to be obtained by being measured by the access node serving the first cell.

11. The network node according to claim 8, wherein the scheduled downlink transmission information comprises one or more of: a frequency allocation, a power, a rank, and a precoder, for the respective first cell and second cell.

12. The network node according to claim 8, wherein the respective first uplink signal strength and second uplink signal strength are to be measured on sounding reference signals from the terminal.

13. The network node according to claim 8, further comprising:
an estimating circuit configured to estimate a Signal to Interference-plus-Noise Ratio, SINR, for the terminal, based on the obtained information comprising the first uplink signal strength, the obtained information comprising the respective second uplink signal strength, and the obtained scheduled downlink transmission information for the respective access node serving the first cell and access node serving second cell, and
wherein the selecting circuit further is configured to perform the selection of the modulation and coding scheme and, if applicable, any one of the rank, the power, the precoding matrix indicator and the frequency allocation, further based on the estimated SINR for the terminal.

14. The network node according to claim 8, wherein the obtaining circuit further is configured to obtain from the terminal, one or more downlink Channel State Information, CSI, measurements, and
wherein the selecting circuit further is configured to perform the selection of the modulation and coding scheme and, if applicable, any one of the rank, the power, the precoding matrix indicator and the frequency allocation, further is based on the respective obtained one or more downlink CSI measurements.

* * * * *